(12) United States Patent
Sindelar

(10) Patent No.: US 7,905,642 B2
(45) Date of Patent: Mar. 15, 2011

(54) EXHAUST STACK AND ROAD TRACTOR EXHAUST PIPE

(76) Inventor: Richard Sindelar, Rock Island, WA (US)

( * ) Notice: Subject to any disclaimer, the term of this patent is extended or adjusted under 35 U.S.C. 154(b) by 106 days.

(21) Appl. No.: 12/118,882

(22) Filed: May 12, 2008

(65) Prior Publication Data

US 2009/0279319 A1 Nov. 12, 2009

(51) Int. Cl.
*B60Q 3/04* (2006.01)
(52) U.S. Cl. ..................... 362/543; 362/485; 362/217.01
(58) Field of Classification Search .................. 362/545, 362/543, 485, 546, 217.01, 219, 555; D12/194
See application file for complete search history.

(56) References Cited

U.S. PATENT DOCUMENTS

| | | | | |
|---|---|---|---|---|
| 5,697,700 | A * | 12/1997 | Huang | 362/259 |
| 6,126,303 | A * | 10/2000 | Gross | 362/544 |
| 6,357,522 | B2 | 3/2002 | Dienhart et al. | |
| 6,378,559 | B1 | 4/2002 | Humphryson | |
| 6,471,377 | B1 * | 10/2002 | Stegall | 362/487 |
| 6,474,839 | B1 | 11/2002 | Hutchison | |
| 6,582,108 | B1 | 6/2003 | Liang | |
| 6,588,923 | B1 | 7/2003 | Shih | |
| 6,623,134 | B1 | 9/2003 | Chang | |
| 6,637,537 | B2 | 10/2003 | Porter et al. | |
| 6,648,022 | B2 | 11/2003 | Pentz et al. | |
| 6,655,823 | B2 | 12/2003 | Chang | |
| 6,663,269 | B1 * | 12/2003 | Leu | 362/487 |
| 6,880,959 | B2 * | 4/2005 | Houston | 362/511 |
| 6,910,793 | B1 | 6/2005 | Shuen | |
| 6,957,903 | B2 | 10/2005 | Arakawa et al. | |
| 7,242,028 | B2 * | 7/2007 | Dry | 257/88 |
| 2003/0151925 | A1 * | 8/2003 | Crunk | 362/545 |
| 2003/0231506 | A1 * | 12/2003 | Chen | 362/487 |
| 2004/0012977 | A1 * | 1/2004 | Hou | 362/545 |
| 2004/0088977 | A1 * | 5/2004 | Huang | 60/607 |
| 2005/0056483 | A1 * | 3/2005 | Tsai | 181/227 |
| 2007/0029132 | A1 | 2/2007 | Feight et al. | |

* cited by examiner

*Primary Examiner* — Evan Dzierzynsk
(74) *Attorney, Agent, or Firm* — Wells St. John P.S.

(57) ABSTRACT

An exhaust stack is provided having an exhaust tube, an outer casing, a light, electrical wiring, and insulating material. The outer casing defines an interior in which the exhaust tube extends. The light is supported by the outer casing. The electrical wiring extends along an inner surface of the outer casing and is coupled to the light to supply power to the light. The insulating material is disposed within the interior of the outer casing between the exhaust tube and the electrical wiring.

20 Claims, 9 Drawing Sheets

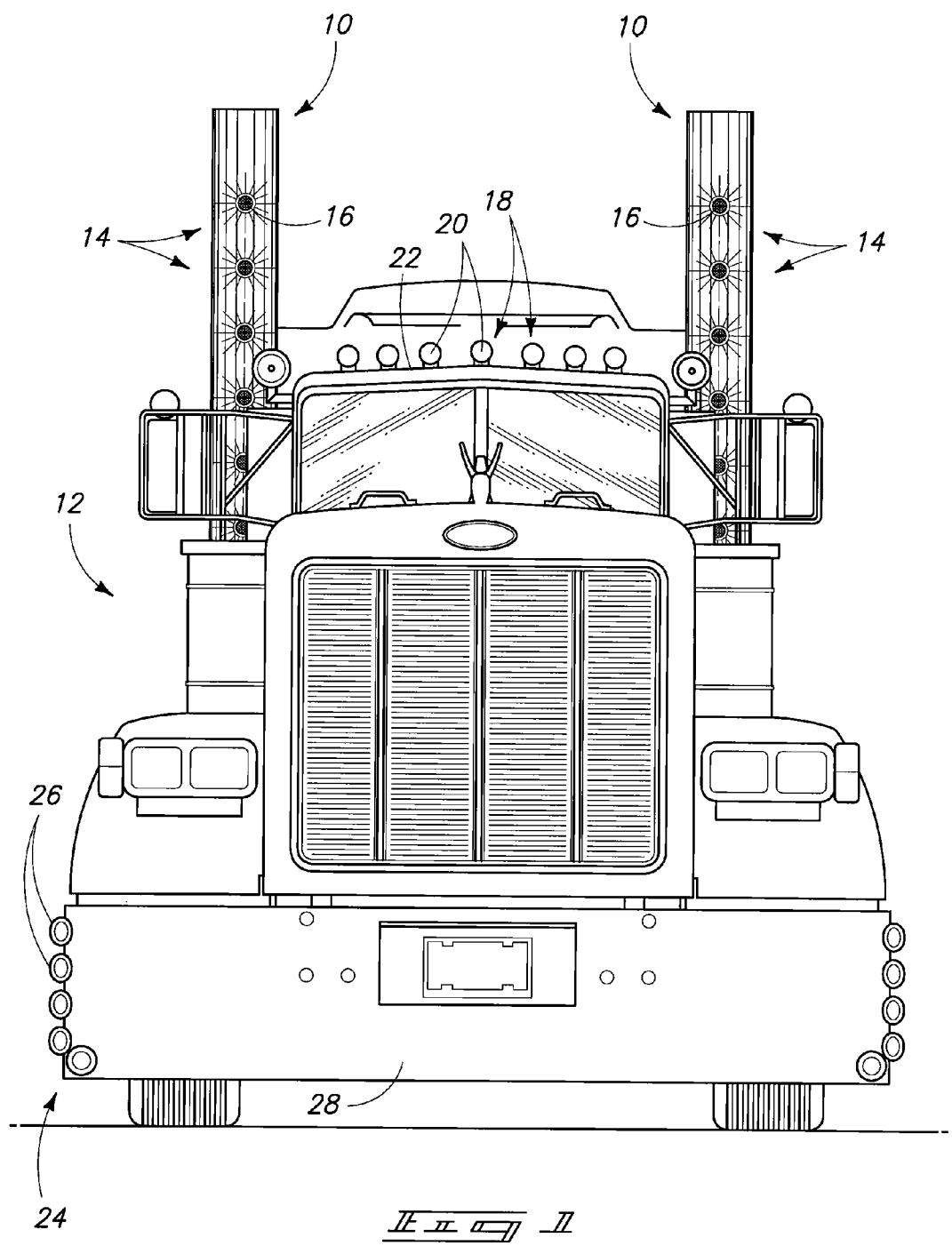

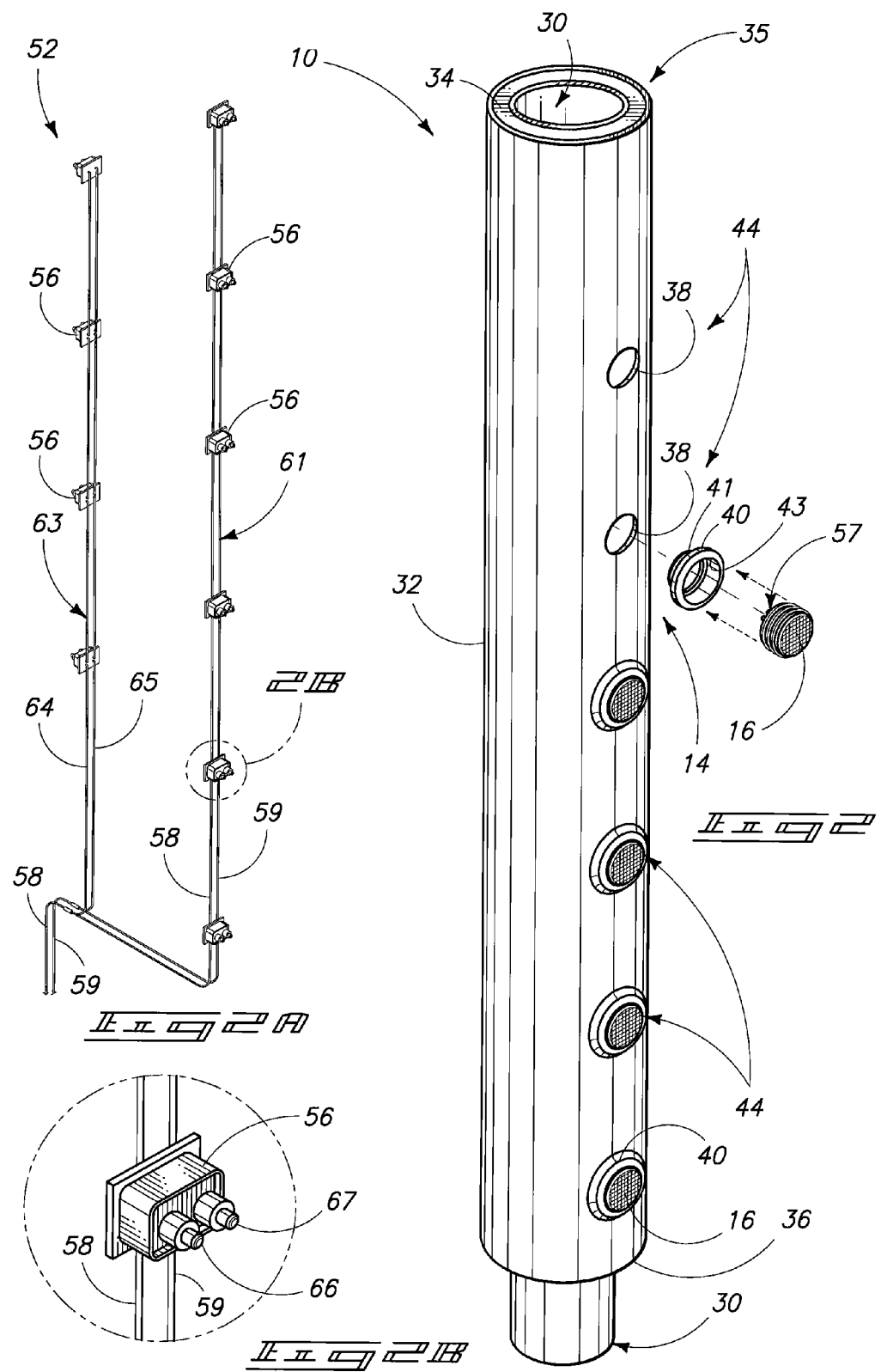

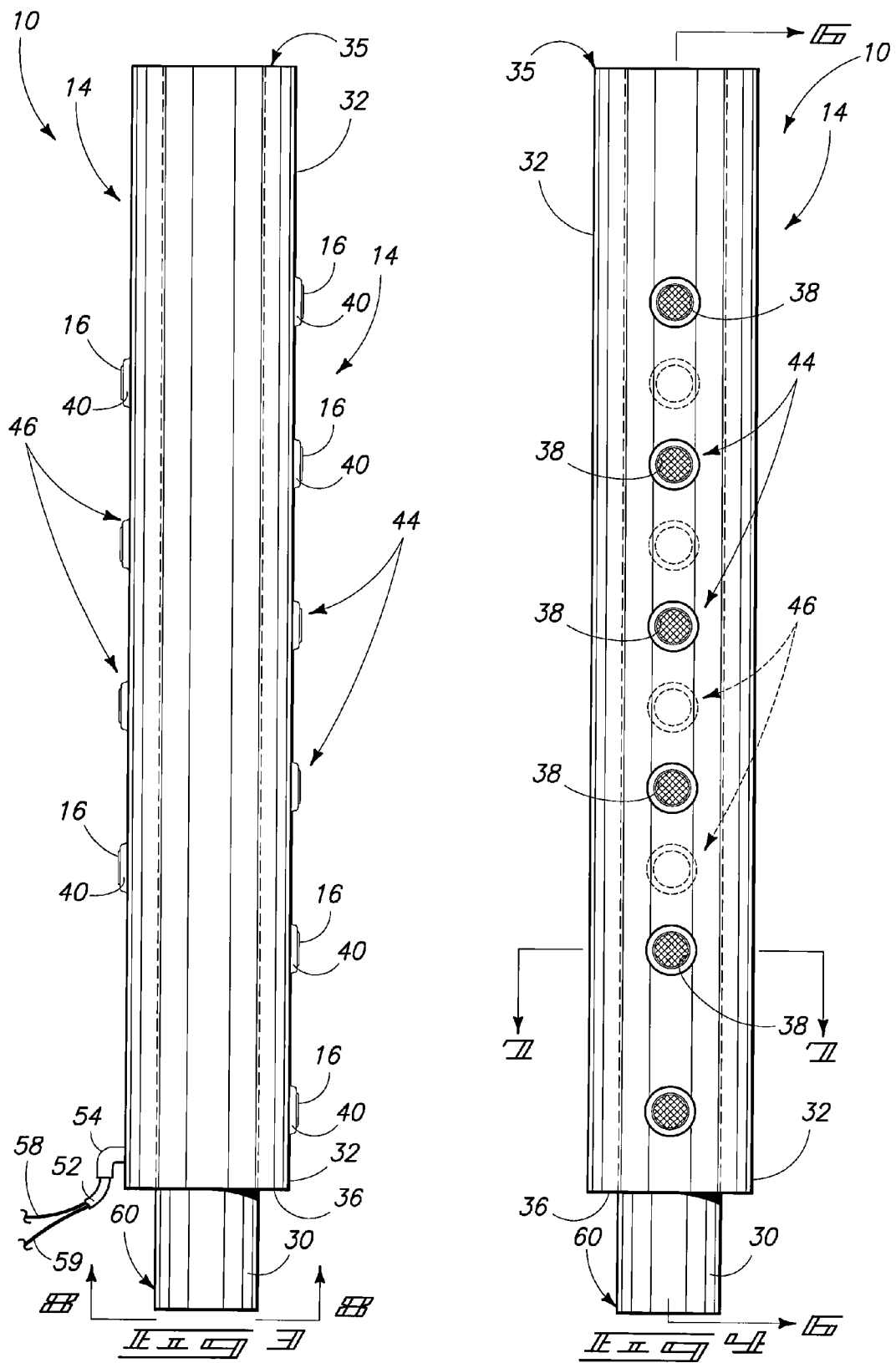

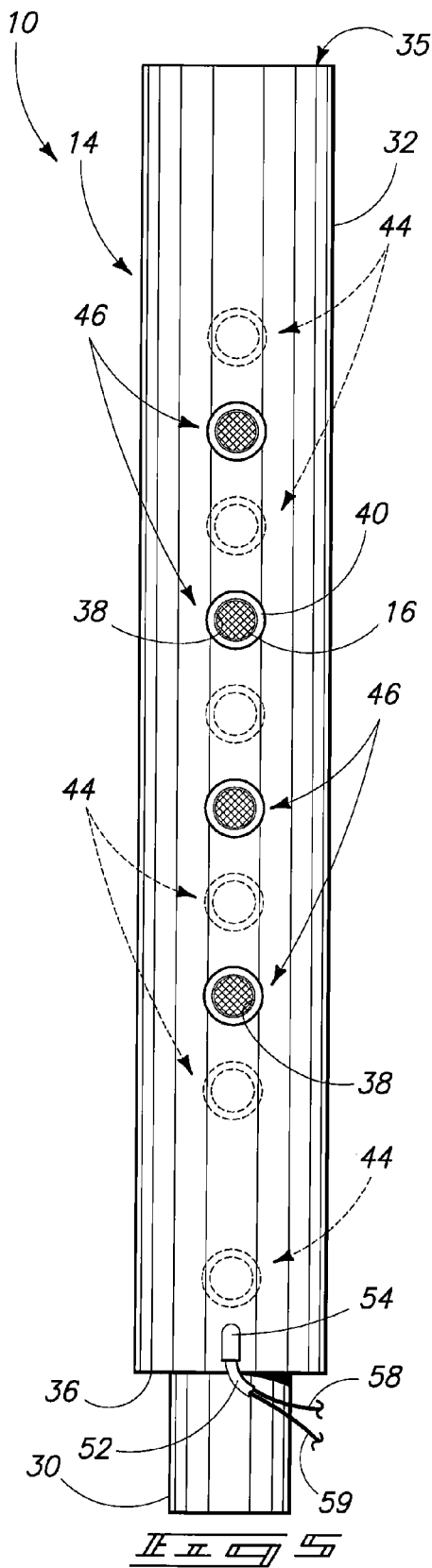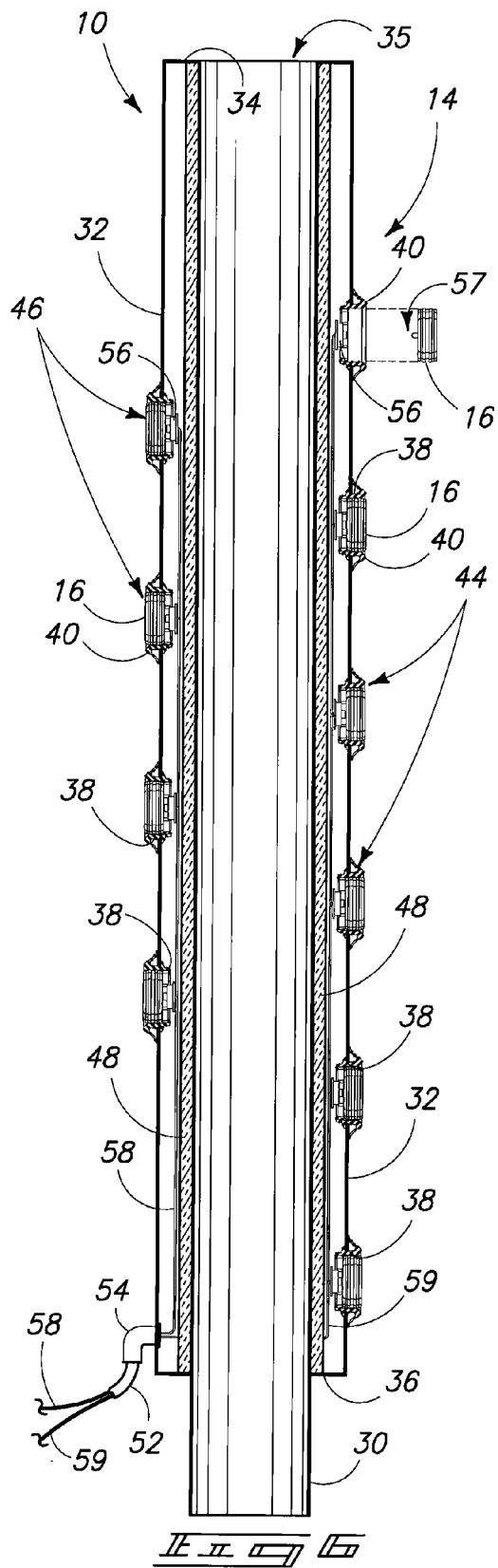

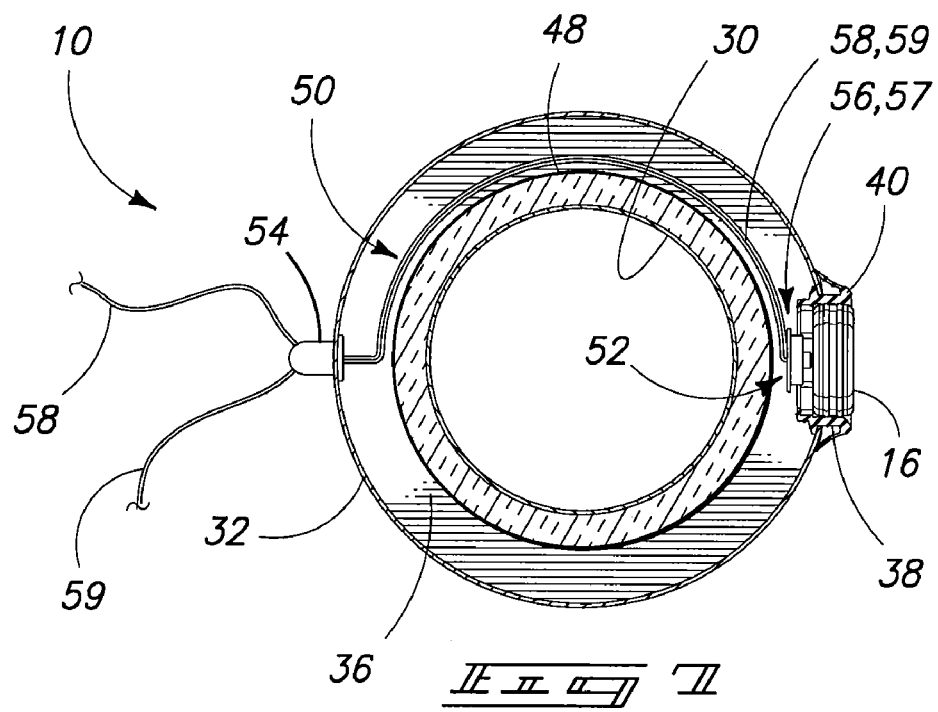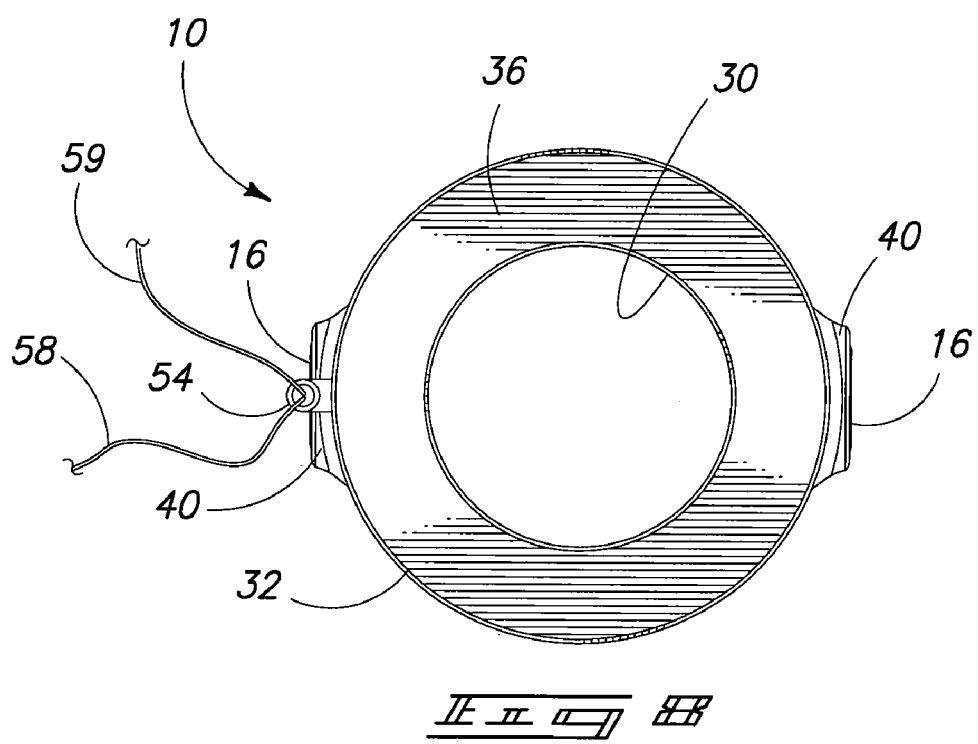

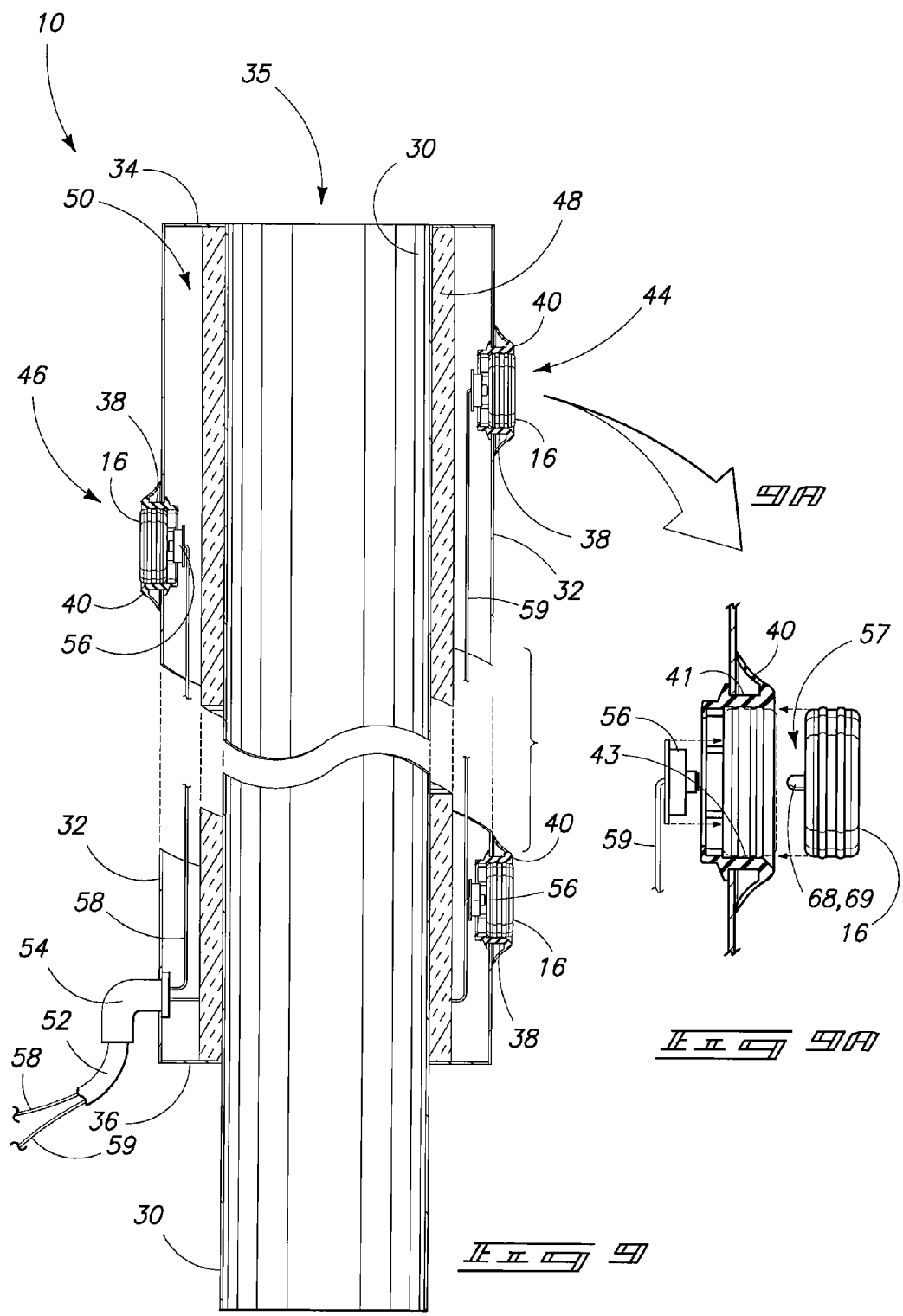

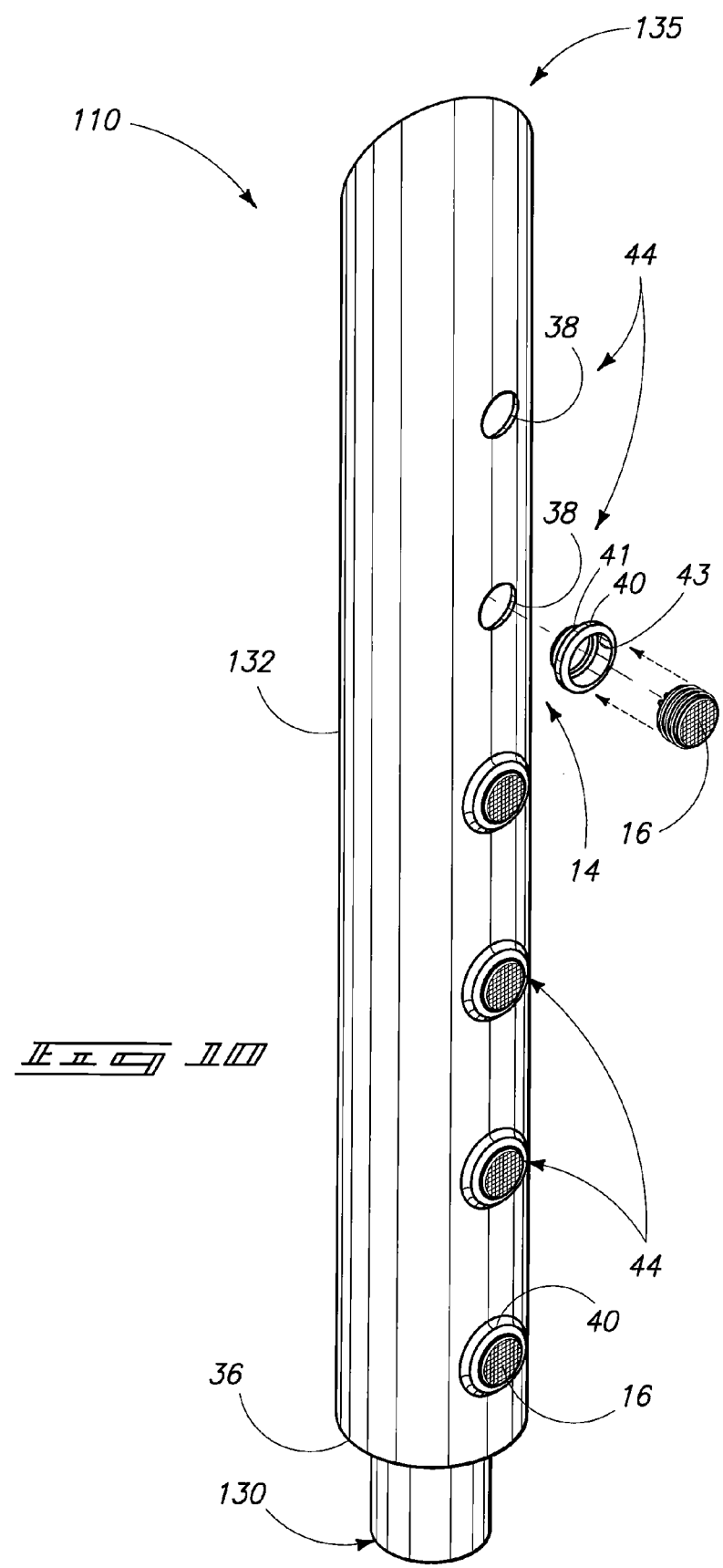

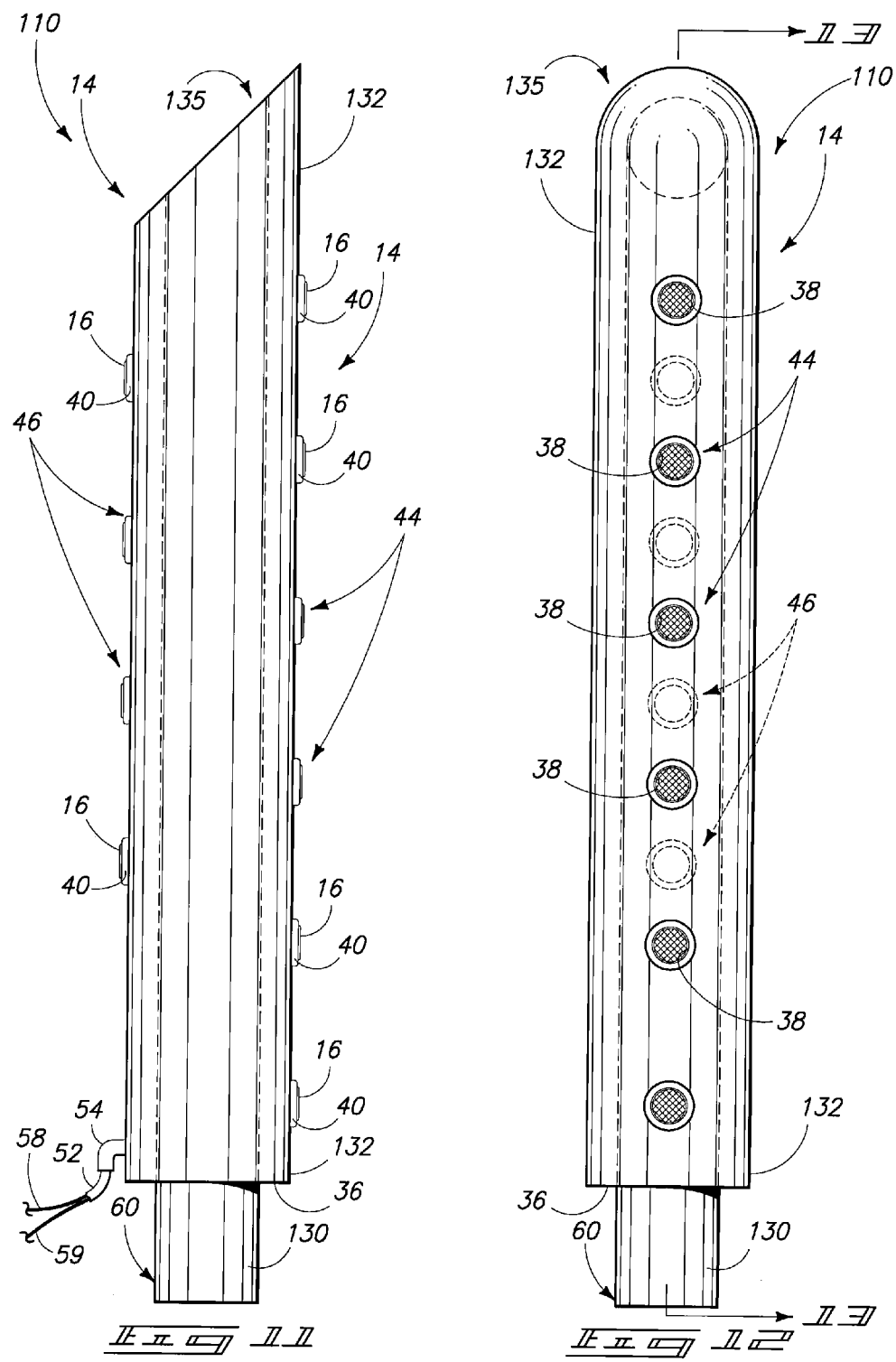

_EXHAUST STACK AND ROAD TRACTOR EXHAUST PIPE_

TECHNICAL FIELD

This invention pertains to vehicle exhaust systems. More particularly, the present invention relates to vehicle exhaust stacks and lighting systems for vehicle exhaust stacks.

BACKGROUND OF THE INVENTION

It is known to provide accessory lighting on vehicles, such as trucks and commercial road tractors for hauling semi-trailers. More particularly, arrangements of amber lights are commonly provided on the cab of a road tractor to increase visibility of the road tractor to oncoming vehicles. One common location to place such lights is on the roof of a cab. However, the use of such lights on pick-up trucks and road tractors makes such vehicles virtually indistinguishable under nighttime driving conditions as viewed by individuals in oncoming vehicles. Accordingly, there exists a need to provide for a unique lighting configuration that extends beyond the cab and that clearly distinguishes a road tractor from other types of vehicles.

The ability to distinguish vehicles can be particularly important, especially when an individual is driving under poor visibility conditions, such as when it is raining, snowing, or under low light conditions, such as at dusk or at night. The ability for an individual, for example, driving a small passenger car to identify and distinguish a road tractor and trailer could be important in providing extra clearance to such a vehicle as they are moving towards them in oncoming traffic. Secondly, such an identification could be important when another road tractor is heading in an opposite direction, particularly if such road tractor is carrying a wide load. Accordingly, it is desirable to further improve the ability to identify the presence of a road tractor visibly with a lighting scheme that enhances readily identification to individuals in opposing oncoming traffic.

SUMMARY OF THE INVENTION

An exhaust stack is provided with a lighting system that enhances the ability to identify a vehicle having such an exhaust stack, particularly under low light conditions. Such an exhaust stack keeps exhaust smoke and fumes from blackening a vehicle body and possibly damaging cargo being hauled by the vehicle. The exhaust stack includes an exhaust pipe with an outer shell that encompasses the exhaust pipe and a light that is carried by the outer shell at a location that is visible to other individuals in other vehicles both present in vehicles in oncoming traffic, as well as vehicles that are passing such a road tractor from behind.

According to one aspect, an exhaust stack is provided having an exhaust tube, an outer casing, a light, electrical wiring, and insulating material. The outer casing defines an interior in which the exhaust tube extends. The light is carried by the outer casing. The electrical wiring extends along an inner surface of the outer casing and is coupled to the light to supply power to the light. The insulating material is disposed within the interior of the outer casing between the exhaust tube and the electrical wiring.

According to another aspect, a vertical exhaust stack is provided having an exhaust pipe, an outer casing, a running light, an electrical wire, and insulation. The outer casing encompasses a section of the exhaust pipe. The running light is affixed to the outer casing. The electrical wire is coupled with the light to power the light and is disposed along an inner surface of the outer casing. The insulation is disposed within the interior of the outer casing between the exhaust tube and the electrical wiring.

According to yet another aspect, a road tractor exhaust pipe is provided with an exhaust pipe, an outer shell, and a light. The outer shell encompasses the exhaust pipe. The light is carried by the outer shell.

BRIEF DESCRIPTION OF THE DRAWINGS

Preferred embodiments of the invention are described below with reference to the following accompanying drawings.

FIG. 1 is a frontal elevational view of a road tractor having a pair of lighted exhaust stacks, according to one aspect of the present invention.

FIG. 2 is an enlarged perspective view of a selected exhaust stack taken from FIG. 1.

FIG. 2A is an enlarged perspective component view of the wiring harness from within the exhaust stack of FIG. 2.

FIG. 2B is a further enlarged perspective view of a selected electrical connector plug taken from encircled region 2B of FIG. 2A.

FIG. 3 is a left side view of the exhaust stack of FIG. 2.

FIG. 4 is a front elevational view of the exhaust stack of FIGS. 2-3.

FIG. 5 is a back elevational view of the exhaust stack of FIGS. 2-4.

FIG. 6 is a center line sectional view of the exhaust stack of FIGS. 2-5 taken along line 6-6 of FIG. 4.

FIG. 7 is a cross sectional view of the exhaust stack of FIGS. 2-6 taken along line 7-7 of FIG. 4.

FIG. 8 is a bottom end view of the exhaust stack of FIGS. 2-7 taken along viewing plane 8-8 of FIG. 3.

FIG. 9 is an enlarged and partially removed center line sectional view of the exhaust stack over that depicted in FIG. 6.

FIG. 10 is a perspective view of an alternatively constructed exhaust stack over that depicted in FIGS. 1-9.

FIG. 11 is a left side view of the exhaust stack of FIG. 10.

FIG. 12 is a front elevational view of the exhaust stack of FIGS. 10-11.

DETAILED DESCRIPTION OF THE PREFERRED EMBODIMENTS

Figure 13:
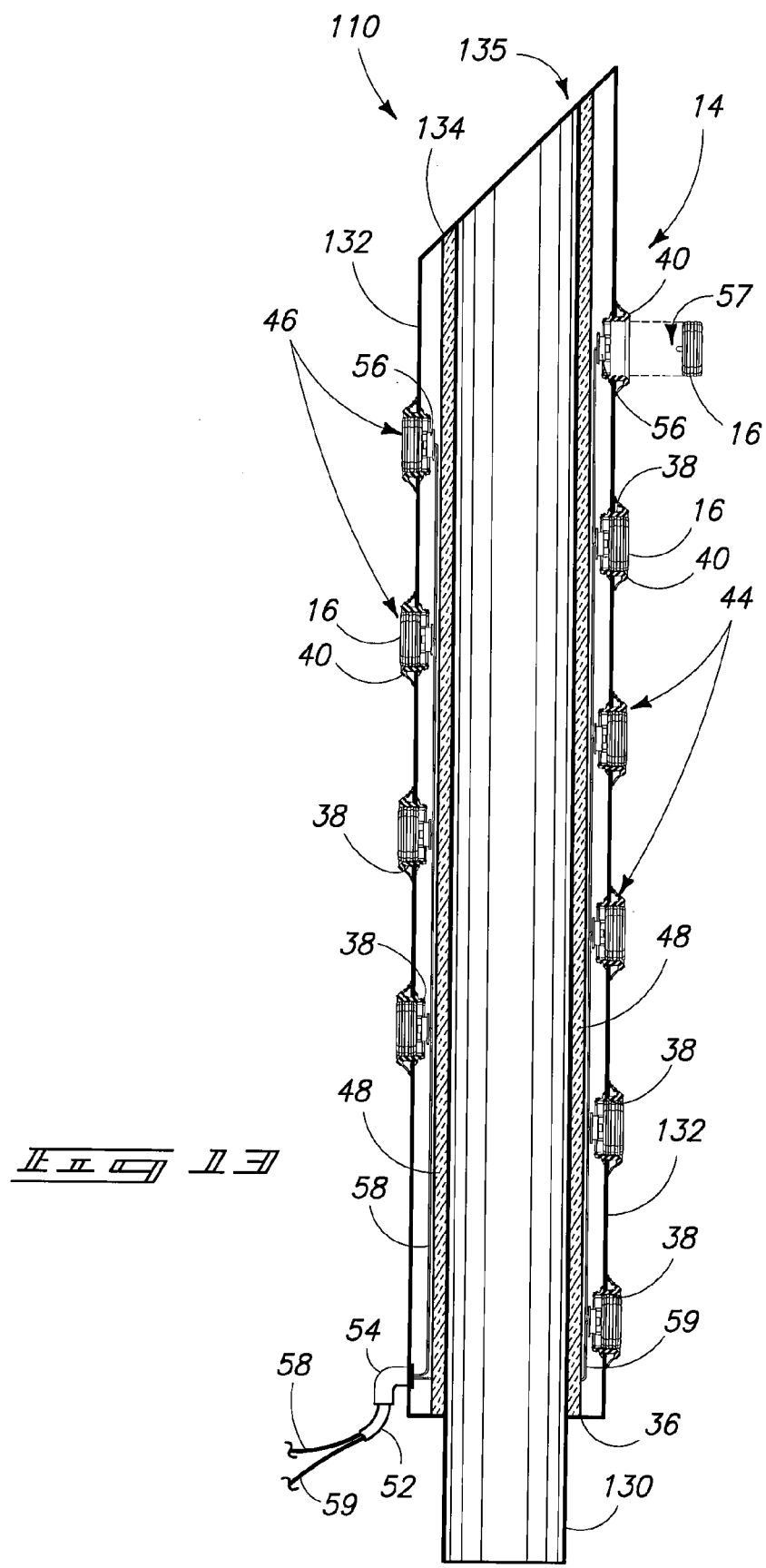
FIG. 13 is a vertical center line sectional view of the exhaust stack of FIGS. 10-12 taken along line 13-13 of FIG. 12.

This disclosure of the invention is submitted in furtherance of the constitutional purposes of the U.S. Patent Laws "to promote the progress of science and useful arts" (Article 1, Section 8).

Reference will now be made to preferred embodiments of Applicant's invention comprising an exhaust stack for a vehicle, such as a road tractor. While the invention is described by way of preferred embodiments, it is understood that the description is not intended to limit the invention to such embodiments, but is intended to cover alternatives, equivalents, and modifications which may be broader than the embodiments, but which are included within the scope of the appended claims.

In an effort to prevent obscuring the invention at hand, only details germane to implementing the invention will be described in great detail, with presently understood peripheral details being incorporated by reference, as needed, as being presently understood in the art.

FIG. 1 illustrates a typical motor vehicle in the form of a road tractor, or semi-trailer truck 12 having a pair of vertically extending exhaust stacks 10. Each exhaust stack 10 has an array 14 of lights 16, according to one aspect of the present invention. Each array 14 of lights 16 imparts a visually distinct illumination pattern to road tractor 12. Each array 14 imparts a visually distinct frontal and rear illumination pattern that helps identify road tractor 12, particularly at nighttime. For example, a visually distinctive frontal illumination pattern is presented as viewed from the front by an individual that is traveling in a vehicle moving in an opposite direction. Similarly, a visually distinctive rear illumination pattern is presented by arrays 14. As will be described in greater detail below, it is understood that array 14 includes lights 16 that are visible in a rear direction relative to road tractor 12 (see FIGS. 3 and 5). In addition to the unique array 14 of lights 16, cab 22 of road tractor 12 also includes a traditional array 18 of lights 20 on a top roof surface of cab 22, as well as an array 24 of individual lights 26 provided on each side edge of front bumper 28.

As shown in FIG. 2, each exhaust stack 10 is formed from an inner exhaust tube 30 and an outer casing, or shell 32 that is joined together by welds using a pair of doughnut or ring-shaped end caps 34 and 36 (see FIG. 8). Each end cap 34 and 36 is welded onto each of exhaust tube 30 and outer casing 34 with a pair of corresponding circumferential welds. A square top end 35 is provided by top end cap 34, inner tube 30, and outer tube 32, as cap 34 is perpendicular to the cylindrical outer surface of casing 34.

Tube 30, shell 32 and end caps 34 and 36 are made from aluminized steel, chromed steel, stainless steel, or another suitable materials, or combination of materials usable to make an exhaust stack. According to one construction, tube 30 is an aluminized steel tube with a 5" outer diameter and 16 gauge wall thickness; shell 32 is a stainless steel tube with an 8" outer diameter and 16 gauge wall thickness; and end caps 34 and 36 are stainless steel sheet with 16 gauge wall thickness.

In order to support lights 16 of front array 44 of array 14, a vertical arrangement of apertures, or cylindrical holes 38 are formed in a front vertical surface of casing 32. Likewise, a similar array of cylindrical holes 38 are formed in a rear vertical surface of casing 32 (see FIGS. 3 and 5). Lights 16 are retained in each hole 38 using a rubber grommet 40. As shown in FIG. 2, a topmost light 16 is shown in exploded view removed from a corresponding grommet 40 that is to be snugly received in snap-fit, or snug-fit relation within hole 38 of casing 32 to retain respective light 16 therein in assembly. Each hole 38 receives a respective grommet 40 and light 16 therein.

One suitable light 42 is manufactured and sold by Maxxima, a Panor Corporation, 125 Cabot Court, Hauppauge, N.Y. 11788, as a Model No. MX-M09100Y, comprising an amber LED clearance marker light having nine LEDs (light emitting diodes), and having a 2 inch outer diameter. One suitable grommet 40 is a Truck-Lite grommet mount, part number 30700, available from Truck-Lite, 310 E. Elmwood Avenue, Falconer, N.Y. 14733, and configured to be received within a cylindrical hole having a diameter ranging from 2.25 inches to 2.3125 inches, and having an inner receiving aperture configured to receive a 2 inch diameter clearance marker light therein.

FIG. 2A illustrates electrical wiring harness 52 as configured within exhaust system 10 of FIG. 2. More particularly, a front branch 61 and a rear branch 63 of wiring harness 52 are provided between inner exhaust pipe 30 and outer shell 32. Front branch 61 includes six individual electrical connector plugs 56 that are electrically coupled together in series using a pair of electrical wires 58 and 59. Likewise, rear branch 63 includes four individual electrical connector plugs 56 that are electrically coupled together in series using another pair of electrical wires 64 and 65. Wires 58 and 64 and wires 59 and 65 are electrically spliced together in parallel, respectively. Wires 58 and 59 then extend further from each splice so they can exit outer shell 32 via wiring port 54 (see FIG. 3). In one case, wires 58 and 64 and wires 59 and 65, respectively, are soldered together and sealed with insulating material, such as liquid rubber or electrical tape. In another case, they are joined together with electrical connectors (not shown). Wires 58 and 59 exit outer shell 32 via wiring port 54 (see FIGS. 5-6). Optionally, a port and/or grommet can guide wires through the outer shell 32. Wires 58 and 59 are then electrically connected via wires into a vehicle wiring harness and power supply system, such as a 12 volt power supply system.

One suitable source for front branch 61 and rear branch 63 is a prefabricated wiring harness manufactured and sold by Maxxima, a Panor Corporation, 125 Cabot Court, Hauppauge, N.Y. 11788, as a Model No. M50950-200 2-pin 6" lean continuous wiring harness. Optionally, connectors 56 can be individually wired to each light with dedicated electrical wires. Further optionally, any form of light, including incandescent lights can be used on exhaust system 10.

FIG. 2B shows in enlarged detail one connector plug 56 from branch 61. Each connector plug 56 includes a pair of female connectors 66 and 67 arranged to mate in complementary coupling engagement with a respective pair of male connectors 68 and 69 (see FIGS. 6 and 9A) on a respective light 16.

As shown in FIG. 3, array 14 of lights 16 comprises a front vertically oriented array 44 and a rear vertically oriented array 46. A substantially cylindrical aperture 38 is provided in outer shell 32 for supporting each light 16 therein via a respective grommet 40. According to one technique, a cylindrical hole saw is used to cut aperture 38 into the cylindrical outer surface of outer shell 32. Accordingly, aperture 38 is not an exact cylindrical hole as aperture 38 has a curved, three-dimensional periphery. Optionally, a water jet cutting device can be used to form each aperture 38.

Further optionally, any suitable cutting device can be used to form apertures 38. Further details of arrays 44 and 46 can be seen in FIGS. 4 and 5, respectively. A flexible and resilient grommet 40 is press-fit into each hole, or aperture 38. According to one construction, a hole saw with a 2.25" outer diameter is used to drill each aperture 38 through outer shell 32. Optionally, apertures 38 can each have a diameter of 2.3125", or any suitable dimension suitable for receiving a grommet and light. Further optionally, a light can be affixed onto an outer surface of shell 32 using fasteners, adhesive, or other suitable attachment mechanisms, or individual lights can be affixed within outer shell 32 with provision of a lens or port to enable viewing.

According to one construction, a wiring port 54 exits outer shell 32 in order to provide a passageway through which a wiring harness 52 is routed. More particularly, port 54 comprises an L-shaped steel tube that is welded onto outer shell 32 about a corresponding through-hole 55 provided in shell 32. Optionally, port 54 can be press fit into hole 55. Optionally, a hole can be provided through outer shell 32 and a rubber grommet can be inserted into the hole, supporting passage of wiring harness 52 through shell 32.

As shown in FIG. 3, a bottom end 60 of inner tube 30 is sized to match a corresponding upstanding tube on a muffler for a road tractor. An exhaust system clamp (not shown) is used to affix exhaust system 10 atop the muffler. One suitable exhaust system clamp is disclosed in U.S. Pat. No. 6,796,004, entitled "Exhaust System Clamp", herein incorporated by reference. One such clamp is sold by Donaldson Company, Inc., of Minneapolis, Minn. 55440-1299 under the product name Stepped SealClamp Exhaust Clamp, Model No. X007785 sized to mount together pipe having an outer diameter of 5". Optionally, bottom end 60 can be welded onto a muffler or an upstanding exhaust pipe, or affixed with any other form of suitable attachment device or clamp.

FIG. 4 illustrates array 44 as seen in a front elevation view. More particularly, array 44 is formed from six individual amber LED lights 16 mounted to outer shell 32 in a vertical arrangement with adjacent lights 16 spaced apart equal distances. Optionally, the number and spacing of lights can be varied in order to achieve a desired optional configuration.

FIG. 5 illustrates array 46 in a rear elevation view. More particularly, array 46 is formed from four individual amber LED lights 16 mounted to outer shell 32 in a vertical arrangement with adjacent lights 16 spaced apart equal distances. Optionally, the number and spacing of lights can be varied in order to achieve a desired optional configuration.

FIG. 6 illustrates the placement of each array 44 and 46 within shell 32 via individual grommets 40 and lights 16. Each pair of a grommet 40 and a respective light 16 is received within a respective aperture 38 in outer shell 32. Additionally, the provision of a cylindrical layer of insulation 48, such as a felt, mat, or fiberglass insulation, is shown between a wiring harness 52 and an outer surface of inner tube 30. One suitable form of insulation is a blanket No. 615, 16 oz. Thermofelt sold in a 6' by 6' dimension by John Tillman Company, 1300 West Artesia Avenue, Compton, Calif. 90220. Other examples of suitable insulation include any fiberglass batting, strand, blanket, ceramic or other suitable heat resistant material. Further optionally, a gas such as provided by an air gap between tubes 30 and 32 can provide a suitable insulating layer in certain cases.

Grommet 40 is formed from a flexible material, such as a rubber or synthetic rubber material. Accordingly, grommet 40 is physically manipulated into aperture 38 where it is retained via an integrally formed groove 41. Optionally or additionally, an interference fit surface can be provided along the outer edge of grommet 40. Subsequently, light 16 is inserted into a complementary receiving aperture 43 in grommet 40. An electrical connector plug 57 on a rear surface of light 16 is mated with a complementary electrical connector plug 56 at a respective location on wiring harness 52. As shown in FIGS. 2, 6 and 9A, each plug 57 includes a pair of male electrical connectors, or contacts 68 and 69 (see FIG. 9A). Insulation 48 protects grommets 40, lights 16, connector plugs 56 and 57 and wiring harness 52 from hot surface temperatures on inner tube 30 generated from hot exhaust gases passing there through.

FIG. 7 further illustrates the cylindrical configuration of insulation 48 provided along an outer surface of inner tube 30, thereby providing an annular gap 50 between insulation 48 and an inner surface of outer tube 32. Gap 50 provides a passage for wiring harness 52. Additionally, gap 50 also provides clearance for electrical connector plugs 56 and 57, a rear portion of grommet 40 and a rear portion of light 16.

FIG. 8 illustrates the cylindrical doughnut, or ring shape of end plate 36. Plate 36 is edge welded to tubes 30 and 32 with a pair of cylindrical welds, respectively. Optionally, a cap-shaped piece can be used to form the end plate.

FIG. 9 shows in greater detail the layout and routing of wiring harness 52 within gap 50 of exhaust system 10. More particularly, wiring harness 52 comprises individual electrical wires 58, 59 and 64, 65 and electrical connector plugs 56. Individual electrical connector plugs 56 releasably connect with complementary connector plugs 57 on each light 16. Wiring harness 52 includes a front portion, or branch 61 that services array 44 and a rear portion, or branch 63 that services array 46. Both portions come together where they exit outer tube 32 via port 54.

FIGS. 10-13 illustrate an alternative construction exhaust system, or exhaust stack 110 having a beveled top end 135. Top end 135 is formed with an elliptical ring-shaped end cap 134 that is edge welded to each of tubes 130 and 132, similar to how cap 34 is welded to tubes 30 and 32 (see FIG. 9). Remaining construction details of exhaust system 110 are essentially the same of those for exhaust system 10 (of FIGS. 1-9). Accordingly, corresponding components are numbered with the same reference numerals as the components found on exhaust stack 10 (of FIGS. 1-9).

It is understood that the provision of lights supported on an outer shell of an exhaust stack in conjunction with wiring provided in a manner that insulates the lights and wire from an exhaust pipe provides the advancement of the present invention. Such advancement can be provided according to multiple alternative constructions that vary in materials and geometry.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An exhaust stack, comprising:
a vehicle;
an exhaust tube having an upstanding portion supported by the vehicle;
an outer casing provided along the upstanding portion and defining an interior in which the exhaust tube extends;
a light carried by the outer casing along the upstanding portion;
electrical wiring extending along an inner surface of the outer casing and coupled to the light to supply power to the light; and
insulating material disposed within the interior of the outer casing between the exhaust tube and the electrical wiring.

2. The exhaust stack of claim 1, wherein the exhaust tube extends coaxially within the outer casing.

3. The exhaust stack of claim 1, wherein the exhaust tube comprises a vertically extending cylindrical exhaust pipe terminating at an uppermost end in an exhaust outlet.

4. The exhaust stack of claim 1, wherein the outer casing comprises a cylindrical housing.

5. The exhaust stack of claim 4, wherein the outer casing further comprises a pair of end caps mounted one at each end portion of the outer casing, each end cap having an aperture sized for passage of the exhaust tube therethrough.

6. The exhaust stack of claim 4, wherein a series of lights are mounted onto the cylindrical housing in spaced-apart relation extending lengthwise along the cylindrical housing.

7. The exhaust stack of claim 6, wherein the exhaust tube comprises a cylindrical exhaust tube terminating in an outlet end having an oblique tubular outlet edge.

8. The exhaust stack of claim 1, wherein the insulating material encircles an outer surface of the exhaust tube within the outer casing, and a coaxial void is provided between an outer surface of the insulating material and an inner surface of the outer casing, wherein the electrical wiring is disposed within the void.

9. A vertical exhaust stack, comprising:
a vehicle;
an exhaust pipe having an upstanding portion supported by the vehicle;
an outer casing encompassing a section of the upstanding portion of the exhaust pipe;
a running light affixed to the outer casing along the upstanding portion;
an electrical wire coupled with the light to power the light and disposed along an inner surface of the outer casing; and
insulation disposed within the interior of the outer casing between the exhaust tube and the electrical wiring.

10. The vertical exhaust stack of claim 9, wherein the outer casing comprises a tubular outer shell and the exhaust pipe comprises a tubular inner shell provided coaxially within the tubular outer shell.

11. The vertical exhaust stack of claim 10, further comprising a pair of ring-shaped end caps, one provided along each end of the tubular outer shell and affixed between the tubular outer shell and the tubular inner shell.

12. The vertical exhaust stack of claim 10, wherein the tubular outer shell and the tubular inner shell are each cylindrical.

13. The vertical exhaust stack of claim 9, wherein a top exit end of the exhaust pipe and the inner casing terminate in an oblique end.

14. The vertical exhaust stack of claim 13, further comprising an elliptical end cap affixed between the oblique end of the exhaust pipe and the oblique end of the inner casing.

15. The vertical exhaust stack of claim 9, wherein a plurality of running lights are each affixed onto the outer casing at distinct locations in elevationally spaced apart relation along the outer casing.

16. The vertical exhaust stack of claim 15, wherein one running light is provided on a front surface of the outer casing and another running light is provided on a rear surface of the outer casing.

17. A road tractor exhaust pipe, comprising:
a road tractor vehicle;
an exhaust pipe having an upstanding portion supported by the road tractor vehicle;
an outer shell encompassing the upstanding portion of the exhaust pipe; and
a light carried by the outer shell along the upstanding portion.

18. The road tractor exhaust pipe of claim 17, wherein the light is a marker light.

19. The road tractor exhaust pipe of claim 17, wherein an aperture is provided in the outer shell, and further comprising a mounting grommet inserted into the aperture.

20. The road tractor exhaust pipe of claim 17, further comprising electrical wiring communicating with the light and routed between the exhaust pipe and the outer shell, and insulation provided between the electrical wiring and the exhaust pipe.

* * * * *